US012654766B2

(12) United States Patent
Reitemann et al.

(10) Patent No.: US 12,654,766 B2
(45) Date of Patent: Jun. 16, 2026

(54) ELECTRO-HYDRAULIC STEERING SYSTEM AND A METHOD OF CONTROLLING AN ELECTRO HYDRAULIC STEERING SYSTEM

(71) Applicant: AGCO International GmbH, Neuhausen (CH)

(72) Inventors: Gabriel Reitemann, Marktoberdorf (DE); Stephan Prestel, Marktoberdorf (DE); Werner Unsinn, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 18/726,509

(22) PCT Filed: Jan. 4, 2023

(86) PCT No.: PCT/IB2023/050058
§ 371 (c)(1),
(2) Date: Jul. 3, 2024

(87) PCT Pub. No.: WO2023/156852
PCT Pub. Date: Aug. 24, 2023

(65) Prior Publication Data
US 2025/0074504 A1     Mar. 6, 2025

(30) Foreign Application Priority Data
Feb. 15, 2022    (GB) ...................................... 2201948

(51) Int. Cl.
*B62D 5/06*         (2006.01)
*B62D 5/065*        (2006.01)
(Continued)

(52) U.S. Cl.
CPC ............... *B62D 5/065* (2013.01); *B62D 5/06* (2013.01); *B62D 5/09* (2013.01); *B62D 5/091* (2013.01);
(Continued)

(58) Field of Classification Search
CPC ............ B62D 5/06; B62D 5/065; B62D 5/09; B62D 5/091; B62D 6/001; B62D 7/15; B62D 7/1536
(Continued)

(56) References Cited

U.S. PATENT DOCUMENTS 5,285,867 A      2/1994  Pedersen et al.
6,494,476 B2 *  12/2002  Masters ............. B62D 53/0871
                                                    280/455.1
(Continued)

FOREIGN PATENT DOCUMENTS

BR     102013023161 B1    4/2021
EP          0983928 A1    3/2000
(Continued)

OTHER PUBLICATIONS

UK Intellectual Property Office, Search Report for related UK Application No. GB2201948.3, dated Jun. 14, 2022, 3 pages.
(Continued)

*Primary Examiner* — Erick R Solis

(57)            ABSTRACT
Electro-Hydraulic Steering System and Method An electro-hydraulic steering system (1) includes a steering wheel (2) for setting a steering demand and a hydraulic steering actuator (11) for turning the steered wheel in response to the steering demand. An electrically controlled hydraulic valve (26) is arranged to supply pressurised fluid to the hydraulic steering actuator to turn the steered wheel according to a variable steering ratio. An electronic control unit (21) receives an angular position of the steering wheel and an angular position of the steered wheel. The control unit is
(Continued)

operative to determine an angular misalignment between the steering wheel and the steered wheel and carry out a realignment procedure. The realignment procedure comprises calculating a compensation angle based on the angular misalignment and controlling the steering ratio based on the compensation angle by controlling the hydraulic valve to adjust the supply of pressurised fluid to the hydraulic steering actuator.

17 Claims, 7 Drawing Sheets

(51) Int. Cl.
B62D 5/09 (2006.01)
B62D 6/00 (2006.01)
B62D 7/15 (2006.01)

(52) U.S. Cl.
CPC .............. B62D 6/001 (2013.01); B62D 7/15 (2013.01); B62D 7/1536 (2013.01)

(58) Field of Classification Search
USPC ............................................... 701/41, 42, 43
See application file for complete search history.

(56) References Cited

U.S. PATENT DOCUMENTS

| | | | |
|---|---|---|---|
| 2003/0028306 A1 | 2/2003 | Fujimori | |
| 2004/0003955 A1* | 1/2004 | Goto | B62D 5/09 |
| | | | 180/421 |
| 2018/0281852 A1* | 10/2018 | Eagles | B62D 5/093 |
| 2020/0262475 A1 | 8/2020 | Stahl et al. | |
| 2020/0406964 A1 | 12/2020 | Hultén et al. | |

FOREIGN PATENT DOCUMENTS

| | | |
|---|---|---|
| JP | H0939818 A | 2/1997 |
| JP | 2003048554 A | 2/2003 |
| JP | 2004099011 A | 4/2004 |
| JP | 2015168294 A | 9/2015 |

OTHER PUBLICATIONS

European Patent Office, Search Report for related PCT Application No. PCT/IB2023/050058, dated Apr. 3, 2023, 15 pages.

* cited by examiner

ELECTRO-HYDRAULIC STEERING SYSTEM AND A METHOD OF CONTROLLING AN ELECTRO HYDRAULIC STEERING SYSTEM

CROSS-REFERENCE TO RELATED APPLICATIONS

This application is a national phase entry under 35 U.S.C. § 371 of International Patent Application PCT/IB2023/050058, filed Jan. 4, 2023, designating the United States of America and published in English as International Patent Publication WO 2023/156852 A1 on Aug. 24, 2023, which claims the benefit of the filing date of U. K. Patent Application 2201948.3, "An Electro-Hydraulic Steering System and a Method Of Controlling an Electro Hydraulic Steering System," filed Feb. 15, 2022, the entire disclosure of which is incorporated herein by reference.

FIELD

Embodiments of the present disclosure relate generally to electro-hydraulic steering systems and methods of controlling electro-hydraulic steering systems.

BACKGROUND

In a hydraulic steering system, rotating a steering wheel generates a steering demand indicating that a steered wheel should be rotated by an angle corresponding to the rotation of the steering wheel. A hydraulic actuator is coupled to the steered wheel to cause the steered wheel to rotate in response to the steering demand. The angle $\Delta\alpha$ by which the steered wheel turns in response to rotation of the steering wheel by an angle $\Delta\Omega$, is determined by the steering ratio R of steering system. The steering ratio R is the ratio of the angle of rotation $\Delta\alpha$ of the steered wheel resulting from a rotation of the steering wheel by an angle $\Delta\Omega$. That is, the steering ratio R is given by the ratio $\Delta\Omega:\Delta\alpha$.

Steering systems can be provided with a variable steering ratio. For example, the steering ratio may be varied based on a vehicle parameter e.g. vehicle speed or steering angle. At a relatively high steering ratio, a larger turn $\Delta\Omega$ of the steering wheel is required to turn the steered wheel by a fixed angle $\Delta\alpha$. At low speeds, it may be desirable to operate at a relatively low steering ratio, to enable relatively fast turns for better maneuverability. At high speeds, a higher steering ratio may be appropriate, in order to maintain stability.

Superimposed hydraulic steering systems provide a variable steering ratio according to a vehicle parameter. In a superimposed hydraulic steering system, a controller determines an appropriate steering ratio, based on at least one vehicle parameter, and controls the steering system to operate at that steering ratio. However, changing the steering ratio in this way can lead to misalignment between the steered wheel and the steering wheel.

In a mechanical steering system the relationship between the angular positon of the steering wheel and that of the steered wheels is generally fixed. Thus, provided the system is correctly set-up with no damage or wear, when the steering wheel is moved to its central position, the steered wheels will be moved to a straight on driving direction. No such automatic realignment is provided in a superimposed hydraulic steering system. Therefore, if the superimposed steering has caused the steering wheel and the steered wheel to become misaligned, the vehicle may not move in the direction expected by the driver and/or the steering wheel may be off-center. This may negatively impact the driver's ability to satisfactorily control the vehicle.

Misalignment between the steering wheel and the steered wheel can also result from driving the vehicle using an autonomous guidance system. When a vehicle is driven using autonomous guidance, rotation of the steered wheel is no longer controlled by the steering wheel. Instead, a controller generates steering demands and controls the hydraulic actuator according to the autonomous guidance. This means that, during an autonomous guidance operation, the steering wheel remains stationary and is not rotated even when the steered wheels are turned. However, once the autonomous guidance operation has concluded, the steered wheels will not necessarily be re-aligned with the position of the steering wheel. For example, usually the steering wheel remains in a central, straight ahead position during an autonomous guidance operation. However, the steered wheels may not be positioned in the straight on driving position corresponding to the center position of the steering wheel when the autonomous guidance is operation is concluded.

It would be desirable to provide a hydraulic steering system in which misalignment is reduced and/or avoided.

BRIEF SUMMARY

In an aspect of the invention there is provided an electro-hydraulic steering system for a vehicle comprising a steered wheel, the electro-hydraulic steering system comprising: a steering wheel for setting a desired steering angle of the steered wheel; a hydraulic steering actuator for turning the steered wheel in response to a steering demand from the steering wheel; an electrically controlled hydraulic valve arranged to supply pressurised fluid to the hydraulic steering actuator to turn the steered wheel through a rotation angle according to a variable steering ratio between the steering wheel and the steered wheel; and a control unit comprising a controller configured to: receive an angular position, D, of the steering wheel and an angular position, L, of the steered wheel; determine an angular misalignment between the angular position, D, of the steering wheel and the angular position, L, of the steered wheel; and carry out a realignment procedure, the realignment procedure comprising: calculating a compensation angle based on the determined angular misalignment; and controlling the steering ratio of the electro-hydraulic steering system based on the compensation angle by controlling the hydraulic valve to adjust the supply of pressurised fluid to the hydraulic steering actuator.

The system may be configured to operate at a primary steering ratio $R_p$, which may be variable. The primary steering ratio $R_p$ may be varied according to a vehicle parameter. For example, it may vary based on vehicle speed or a vehicle steering parameter. The realignment procedure may cause the system to change the steering ratio based on the compensation angle. When the system is controlled to operate at a steering ratio that is determined based on the compensation angle, it operates at a "compensated steering ratio" $R_c$. By adjusting the steering ratio of the system using the hydraulic valve to cause the system to operate at the compensated steering ratio $R_c$, misalignment between the steered wheel and the steering wheel can be reduced/avoided, improving user comfort and safety.

The steering ratio may be adjusted to reduce or extend a rotation angle that the steered wheel is turned through in response to the steering demand, as compared to the rotation angle the steered wheel would have otherwise been turned through to meet the steering demand. That is, the compensated steering ratio $R_c$ may cause the rotation angle of the steered wheel to be reduced or extended as compared to the rotation angle the steered wheel would have turned through if the system had been operated at the primary steering ratio $R_p$.

The controller may be configured to determine an aligned angular position, L*, of the steered wheel in relation to the angular position, D, of the steering wheel. The controller may be configured to determine the misalignment by comparing the actual angular position, L, of the steered wheel with the aligned angular position, L*, of the steered wheel. The aligned angular position, L*, of the steered may comprise an expected angular position of the steered wheel corresponding to the angular position, D, of the steering wheel and the primary steering ratio $R_p$ applicable at the time. The controller may be configured to determine the aligned angular position, L*, of the steered wheel with respect to the current angular position, D, of the steering wheel.

The controller may be configured to determine, based on the steering demand, a demanded rotation angle of the steered wheel and a turning direction. The realignment procedure may further comprise: determining if the current angular position, L, of the steered wheel is ahead of or behind the aligned angular position, L*, of the steered wheel in the turning direction; and, if the current angular position, L, of the steered wheel is ahead of the aligned angular position, L*, of the steered wheel in the turning direction, adjusting the steering ratio of the electro-hydraulic steering system to reduce the rotation angle of the steered wheel by the compensation angle, so as to rotate the steered wheel by a compensated rotation angle; or, if the current angular position, L, of the steered wheel is behind the aligned angular position, L*, of the steered wheel in the turning direction, adjusting the steering ratio of the electro-hydraulic steering system to increase the rotation angle of the steered wheel by the compensation angle, so as to rotate the steered wheel by a compensated rotation angle.

The controller may be configured to demine that the current angular position, L, of the steered wheel is ahead of the aligned angular position, L*, of the steered wheel, if the turning direction is such that the steered wheel is rotated in an angular direction away from the aligned angular position, L*, to meet the steering demand.

The controller may be configured to demine that the current angular position, L, of the steered wheel is behind the aligned angular position, L*, of the steered wheel, if the turning direction is such that the steered wheel is rotated in an angular direction toward from the aligned angular position, L*, to meet the steering demand, The controller may be configured to: receive vehicle parameter data; determine and adapt the primary steering ratio $R_p$ based on the vehicle parameter data by controlling the hydraulic valve to supply fluid to the hydraulic actuator according to the primary steering ratio $R_p$; and control the electro-hydraulic steering system to operate at a compensated steering ratio $R_c$ by adjusting the steering ratio based on the compensation angle. The vehicle parameter is a parameter related to the vehicle. For example, the vehicle parameter may be a steering parameter, such as the turning angle of the steering wheel i.e. the angle through which the steering wheel is turned, or the angle of rotation $\Delta\alpha$ of the steered wheel i.e. the angle through which the steered wheel is turned.

The realignment procedure may comprise: determining a demanded rotation angle of the steered wheel based on the steering demand, according to a primary steering ratio $R_p$;

determining a compensated rotation angle, wherein determining the compensated rotation angle comprises combining the demanded rotation angle and the compensation angle; and adjusting the primary steering ratio $R_p$ to a compensated steering ratio $R_c$ for causing the steered wheel to rotate through the compensated rotation angle in response to the steering demand.

The compensated rotation angle may be determined by adding the compensation angle to the demanded rotation angle to increase the rotation angle of the steered wheel. The compensated rotation angle may be determined by subtracting the compensation angle from the demanded rotation angle to reduce the rotation angle of the steered wheel.

Calculating the compensation angle may comprise determining the product of the angular misalignment and a compensation factor. The compensation factor may be less than 1.

The compensation factor can be determined according to whether the current angular position, L, of the steered wheel is ahead of or behind the aligned angular position, L*, of the steered wheel in the turning direction. The controller may be configured to apply a first compensation factor if the current angular position of the steered wheel, L, is ahead of the aligned angular position, L*, and to apply a second compensation factor if the current angular position of the steered wheel, L, is behind the aligned angular position, L*; wherein the first compensation factor is less than 0.85 and the second compensation factor is less than 0.5; or the first compensation factor is less than 0.33 and the second compensation factor is less than 0.20; or the first compensation factor is less than 0.17 and the second compensation factor is less than 0.10.

The realignment procedure may comprise determining the compensation factor based on a compensation vehicle parameter. The compensation vehicle parameter may be the steering wheel angle Q (i.e. the current angular position of the steering wheel), the angle of the steered wheel α (i.e. the current angular position of the steered wheel), the amount of misalignment, the demanded rotation angle $\Delta\alpha$ of the steering demand, the turning direction of the steering demand, the rotation angle $\Delta\alpha$ of the steered wheel resulting from the steering demand at the current steering ratio, vehicle speed, change in vehicle speed, rotational speed of the steering wheel, the current steering ratio, and/or an operating mode of the vehicle.

Higher rotation angles $\Delta\alpha$ may be associated with relatively low compensation factor, whereas low rotation angles $\Delta\alpha$ may be associated with relatively high compensation factors.

The controller may be configured to determine the compensation angle by determining an upper compensation limit, wherein the upper compensation limit is a fraction of the rotation angle of the steered wheel according to the turning angle of the steering demand; and the controller may further be configured to determine a compensation factor that limits the compensation angle to a value below the upper compensation limit.

The controller may be configured to determine a fraction associated with the turning angle, and determine an upper compensation limit by determining the product of the fraction associated with the turning angle and the turning angle.

The controller may be configured to determine if the angular misalignment meets or exceeds a threshold value and to only carry out the realignment procedure if the angular misalignment meets or exceeds the threshold value.

The controller may be configured to determine if the realignment procedure has cancelled the angular misalignment and, if it is determined that the realignment procedure has not cancelled the angular misalignment, the controller can be configured to determine an updated angular misalignment and to repeat the realignment procedure.

The controller may be configured to iteratively carry out the realignment procedure, determine if the realignment procedure has cancelled the angular misalignment and, if the realignment procedure has not cancelled the angular misalignment, determine an updated angular misalignment and repeat the misalignment procedure.

The electro-hydraulic steering system may further comprise a hydro-mechanical steering unit configured to deliver fluid to the hydraulic steering actuator in dependence on the steering demand; wherein the hydraulic valve may be configured to adjust the amount of fluid delivered by the hydro-mechanical steering unit to the hydraulic steering actuator in response to the steering demand, according to the primary steering ratio $R_p$ or the compensated steering ratio $R_c$. The hydro-mechanical steering unit may be an Orbitrol®.

The hydraulic actuator may comprise a first hydraulic line and a second hydraulic line; a steering cylinder and an axially movable piston within the steering cylinder, wherein the axially movable piston is coupled to the first hydraulic line and the second hydraulic line such that a change in pressure in the first and second hydraulic lines changes the position of the piston; a first steering arm for turning a first steered wheel and a second steering arm for turning a second steered wheel, wherein the piston is coupled to the first steering arm and the second steering arm to steer the first steering arm and the second steering arm in response to the change of the position of the piston.

The electro-hydraulic vehicle steering system may further comprise: a steering wheel sensor for sensing an angular position of the steering wheel; a steered wheel sensor for sensing an angular position of the steered wheel; and a speed sensor for sensing the speed of the vehicle.

At least when operating in a steering misalignment correction mode, the controller may be configured to substantially continually: monitor the angular position, D, of the steering wheel and the angular position, L, of the steered wheel; substantially continually determine whether there is any misalignment between the steering wheel and the steered wheel and adjust the steering ratio so as to reduce any determined misalignment and/or to maintain any determined misalignment within a predefined tolerance when the steered wheel is turned in response to a steering demand. Substantially continually may comprise the controller operating at a rate in the region of 5 to 60 Hz or at a rate in the region of 10 to 50 Hz.

In some embodiments, there is provided an agricultural vehicle comprising the above-described electro-hydraulic steering system.

According to an aspect of the invention, there is provided a computer implemented method of controlling an electro-hydraulic steering system for a vehicle comprising a steering wheel and a steered wheel, the method comprising: determining an angular misalignment between the angular position of the steering wheel and the angular position of the steered wheel; determining a steering ratio; and carrying out a realignment procedure, the realignment procedure comprising: calculating a compensation angle based on the angular misalignment; and outputting a control signal for controlling the steering ratio of the vehicle based on the compensation angle.

The method may further comprise: receiving a steering demand for rotating the steered wheel through a rotation angle; determining a turning direction of the steering demand; and determining an aligned angular position (L*) of the steered wheel in relation to an angular position (D) of the steering wheel, wherein the realignment procedure comprises: determining if an angular position of the steered wheel (L) is ahead of or behind the aligned angular position (L*) of the steered wheel in the turning direction; and, if the angular position (L) of the steered wheel is ahead of the aligned angular position (L*) of the steered wheel in the turning direction, adjusting the steering ratio of the electro-hydraulic steering system to decrease the rotation angle of the steered wheel by the compensation angle, so as to rotate the steered wheel by a compensated rotation angle; or, if the current angular position (L) of the steered wheel is behind the aligned angular position (L*) of the steered wheel in the turning direction, adjusting the steering ratio of the electro-hydraulic steering system to increase the rotation angle of the steered wheel by the compensation angle, so as to rotate the steered wheel by a compensated rotation angle.

The method may further comprise: receiving a steering demand for turning the steered wheel; determining a turning direction of the steering demand, wherein the steering demand corresponds to a rotation of the steering wheel from a first angular position to a second angular position; determining an aligned angular position, L*, of the steered wheel in relation to the first or the second angular position of the steering wheel; and wherein the realignment procedure can comprise: determining if the angular position of the steered wheel, L, is ahead of or behind the aligned angular position, L*, of the steered wheel in the turning direction; and if the angular position, L, of the steered wheel is ahead of the aligned angular position, L*, of the steered wheel in the turning direction, adjusting the steering ratio of the electro-hydraulic steering system to decrease the rotation angle of the steered wheel by the compensation angle; or if the current angular position, L, of the steered wheel is behind the aligned angular position, L*, of the steered wheel in the turning direction, adjusting the steering ratio of the electro-hydraulic steering system to increase the rotation angle of the steered wheel by the compensation angle.

The method may further comprise: determining a demanded rotation angle of the steered wheel based on the steering demand, according to a primary steering ratio $R_p$; determining a compensated rotation angle, wherein determining the compensated rotation angle comprises combining the demanded rotation angle and the compensation angle; and adjusting the primary steering ratio $R_p$ to a compensated steering ratio $R_c$ for causing the steered wheel to rotate through the compensated rotation angle in response to the steering demand.

The method may comprise determining if the realignment procedure has cancelled the angular misalignment and, if it is determined that the realignment procedure has not cancelled the angular misalignment, determining an updated amount of angular misalignment and repeating the misalignment procedure.

The method may comprise generating a control signal configured to adjust the steering ratio of the hydraulic steering system by providing a control signal for controlling an electro-hydraulic valve.

The method may comprise substantially continually: monitoring the angular position, D, of the steering wheel and the angular position, L, of the steered wheel and determining whether there is any misalignment between the steering wheel and the steered wheel; and adjusting the steering ratio so as to reduce any determined misalignment and/or to maintain any determined misalignment within a predefined tolerance when the steered wheel is turned in response to a steering demand. Substantially continually may comprise operating at a rate in the region of 5 to 60 Hz or in the region of 10 to 50 Hz.

According to an aspect of the invention, there is provided a computer program product comprising instructions which, when the program is executed by a computer, cause the computer to carry out the above-described method.

According to an aspect of the invention, there is provided a computer-readable medium having stored thereon the above-described computer program product.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the disclosure will now be described, by way of example only, with reference to the accompanying drawings, in which.

DETAILED DESCRIPTION

Figure 1:
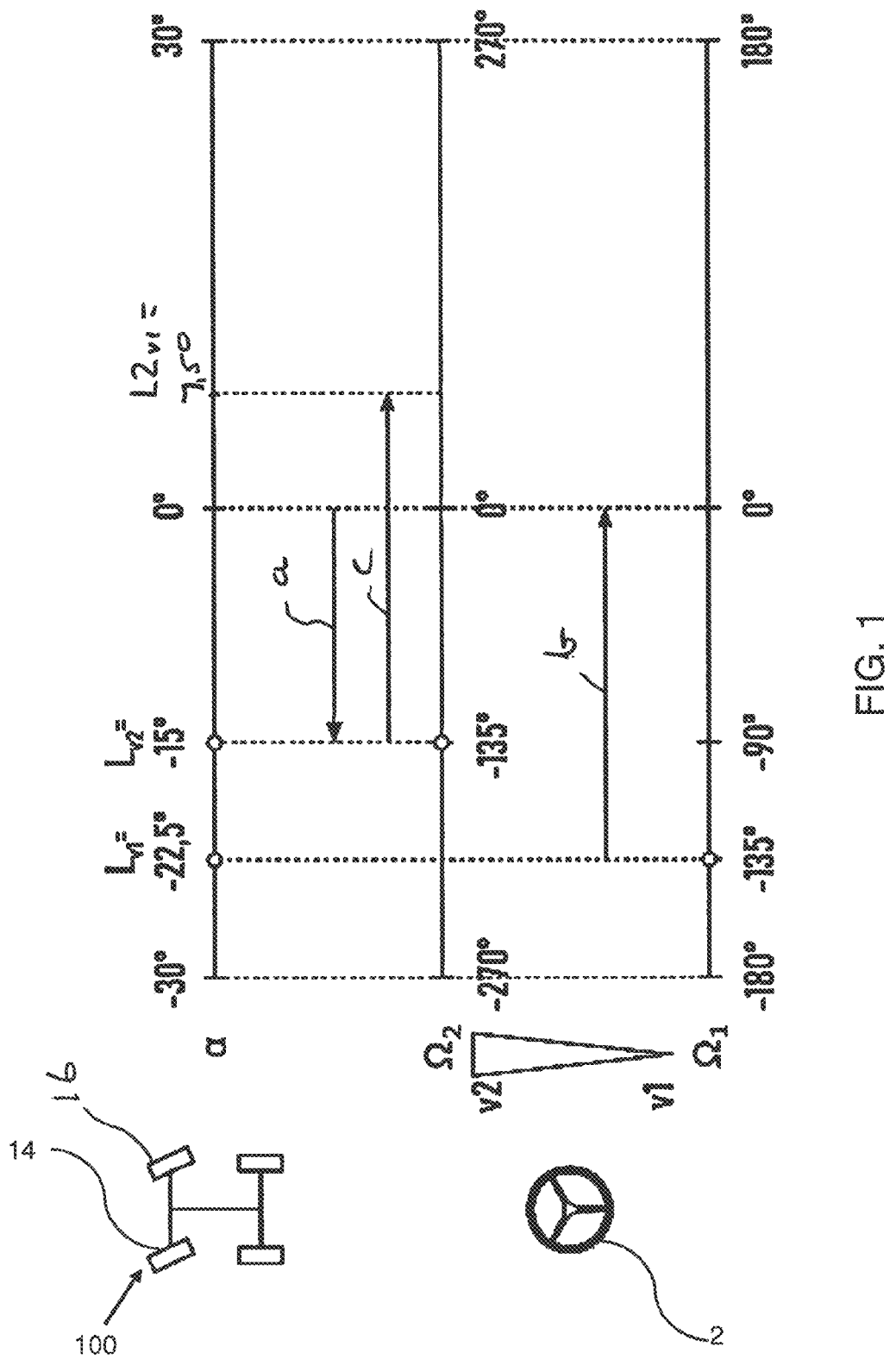
FIG. 1 is a schematic diagram illustrating a change in steering ratio according to vehicle speed.

FIG. 1 schematically illustrates an example of how changing the primary steering ratio $R_p$ during a driving operation can lead to misalignment between the position of the steered wheels 14, 16 of the vehicle 100 and the position of the steering wheel 2. In the example shown in FIG. 1, the primary steering ratio $R_p$ is automatically changed according to vehicle speed.

It is assumed that the front wheels 14, 16 of the vehicle 100 can be steered between a maximum left steering angle $\alpha$ of −30° and a maximum right steering angle $\alpha$ of 30°. When the vehicle 100 is driven with a speed v1, the system is controlled to operate at a first primary steering ratio, $R_{p1}$, in which the steering wheel angle $\Omega_1$ moves within a range of −180° to 180° (see the lower horizontal line in FIG. 1) in order to move the front wheels through their full range of angular movement giving a steering ratio $R_{p1}$ of 6:1. That is, the front wheels can be steered from the straight on driving direction to the maximum left steering angle of −30° by turning the steering wheel 2, from the straight on position to the −180° steering angle 521, through a turning angle of −180° to the left (a counter-clockwise rotation). The front wheels can be steered from the straight on driving direction to the maximum right steering angle of 30° by rotating the steering wheel 2, from the straight on position to the 180° steering angle, through a turning angle of 180° to the right (clockwise rotation). The superimposed steering system is configured such that if the speed of the vehicle 100 increases, the primary steering ratio $R_p$ increases. Accordingly, to achieve the same steering action of the front wheels at a relatively high speed, a greater steering wheel turning angle is required. For example, if the vehicle is driven with a speed v2 (wherein v2>v1), at a primary steering ratio $R_{p2}>R_{p1}$, a steering wheel turning angle $\Omega_2=\pm270°$ is required to rotate the steered wheel from the straight on position to an angle of ±30° giving a steering ratio $R_{p2}$ of 9:1. This is illustrated by the middle horizontal line in FIG. 1.

If the vehicle 100 is initially driven at the speed v2 and the steering wheel 2 is rotated from the straight on position to a steering angle $\Omega_2=-135°$ the front wheels will turn to a steering angle $\alpha=L_{v2}=-15°$ as indicated by arrow a. If the speed of the vehicle 100 is then reduced from v2 to v1 the steering ratio decreases from 9:1 to 6:1.

Despite the change of steering ratio, the steered wheels stay in the position $\alpha=L_{v2}=-15°$. As shown in FIG. 1, the theoretical steering angle of the steered wheel when the steering wheel is positioned at $\Omega_1=-135°$ and the steering ratio is $R_{p1}$ is $\alpha=L_{v1}=-22.5°$. This being the aligned angular position L* of the steered wheel for the position of the steering wheel at the new steering ration $R_{p1}$. If the steering wheel 2 is brought back to neutral position (0°), by a rotation of 135° in the clockwise direction, as indicated by arrow b, whilst the vehicle drives at the speed v1 and the steering ratio is set at $R_{p1}$, the front wheels will be turned by 22.5° rather than by 15°, as indicated by arrow c. This means that although the steering wheel is positioned for straight on driving, the front wheels are turned to the right by 7.5° at position L2$_{v1}$. At the steering ratio $R_{p1}$, the wheels 14, 16 would have reached their center positon $\alpha=0°$ when the steering wheel 2 was rotated by 90°. So, the steering wheel 2 is misaligned by an angle of 135°−90°=45° with respect to the center position of the steered wheels ($\alpha=0°$) as a consequence of the change in steering ratio between effecting a turn and returning to the straight ahead driving position.

As illustrated by FIG. 1, although providing a superimposed hydraulic steering system in which the steering ratio is varied can help to maintain stability at high speeds whilst providing increased maneuverability at low speeds, it can also lead to misalignment between the steering wheel 2 and the steered wheel 14. This is in contrast to a mechanical steering system or a system using a fixed steering ratio, where the steering wheel is re-aligned to the center position ($\Omega=0$) if the front wheels are positioned for straight on driving ($\alpha=0$), all other things being equal.

The inventors have realized that reducing misalignment between the steered wheel and the steering wheel would provide an improved driving experience and improve safety.

Figure 2:
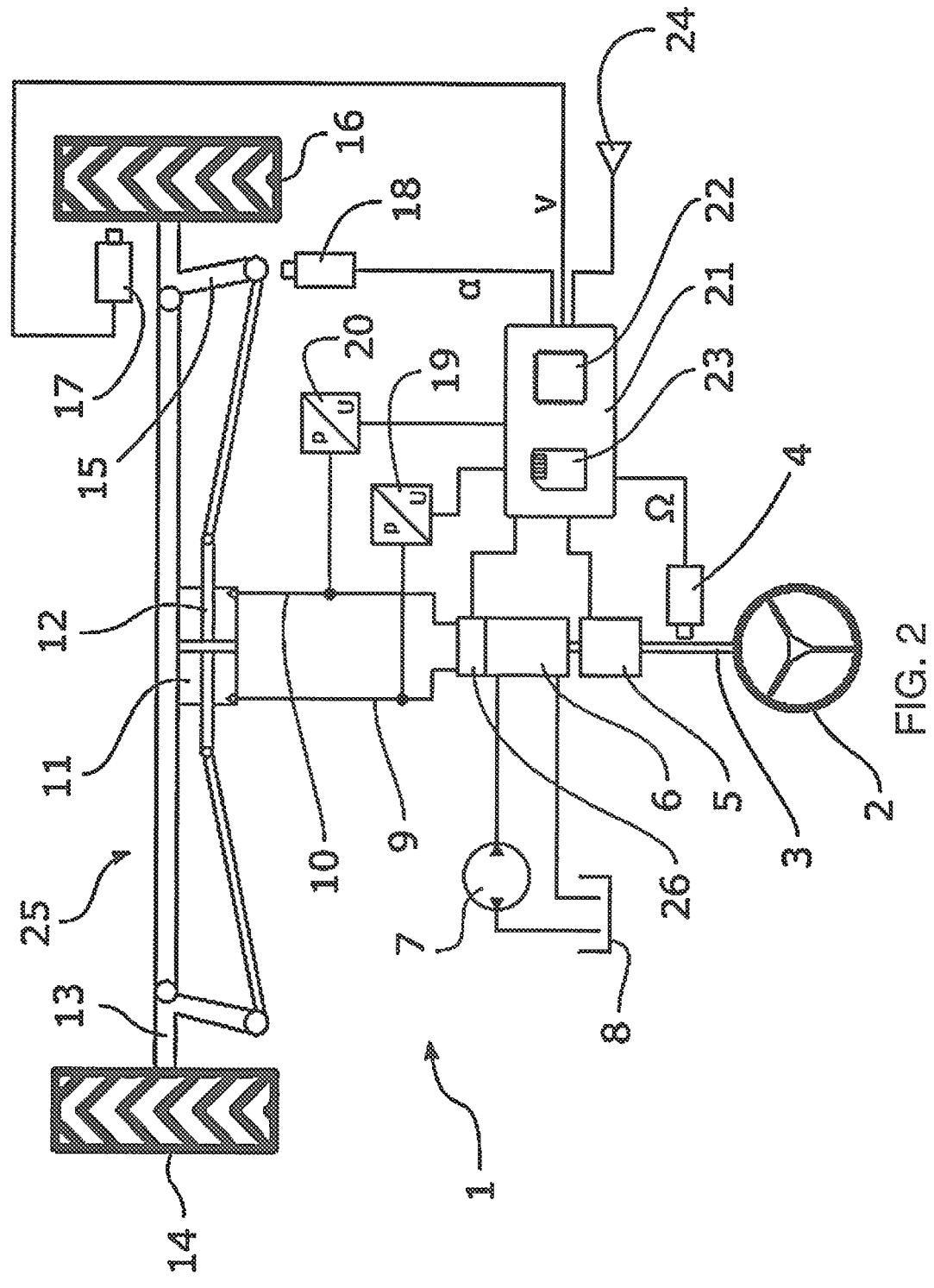
FIG. 2 is a diagram illustrating schematically an electro-hydraulic steering system.

According to an example of an aspect of the invention there is provided a steering system 1 for a vehicle 100 comprising at least one steered wheel (here the steered wheels 14, 16) as shown in FIG. 2. The steering system 1 is configured as an electro-hydraulic, superimposed steering system. The steering system 1 comprises a steering wheel 2 for setting a desired steering angle (i.e. angular position) of the steered wheels 14, 16 and a hydraulic steering actuator 11 operably coupled to the steered wheels 14, 16 to turn the steered wheels 14, 16 in response to the steering demand from the steering wheel 2. The steering wheel 2 is coupled to a steering column 3 which is arranged to transmit rotational movement of the steering wheel 2 to a hydro-mechanical steering unit 6 in the form of an Orbitrol®. The hydro-mechanical steering unit may also be referred to as a hand metering unit. The hydro-mechanical steering unit 6 is hydraulically connected to a pump 7, which is arranged to pump hydraulic fluid from a tank 8 to the hydro-mechanical steering unit 6. The hydro-mechanical steering unit 6 is also connected to the hydraulic steering actuator 11 by a first hydraulic line 9 and a second hydraulic line 10. The hydraulic steering actuator comprises a steering cylinder 11 housing a piston 12. The piston 12 is arranged to move axially within the steering cylinder 11. The hydraulic steering actuator 11 is coupled to the steering arrangement 25 via the piston 12. The piston 12 and steering arrangement 25 are arranged such that axial movement of the piston 12 causes the steered wheels 14, 16 to turn. The steering arrangement 25 comprises a left steering arm 13, to which the left steered wheel 14 is rotatably mounted, and a right steering arm 15 to which the right steered wheel 16 is rotatably mounted. An electrically controlled hydraulic valve 26 is arranged to vary the supply of pressurised fluid from the orbital 6 to the hydraulic steering actuator to turn the steered wheels 14, 16 according to a variable primary steering ratio $R_p$ between the steering wheel 2 and the steered wheel 14, 16.

It will be appreciated that steering actuator 11 and general steering arrangement can be configured in various different ways and that the hydro-mechanical steering unit 6 can be connected to the steering actuator 11 in any appropriate way that results in turning movement of the steered wheels 14, 16 in the desired direction as indicated by the direction of rotation of the steering wheel 2. For example, rather than a single, double acting hydraulic cylinder, the steering actuator 11 may include a pair of double acting hydraulic cylinders operatively connected to the steered wheels 14, 16 such that extension of a first one of the cylinders and retraction of a second one of the cylinders causes the steered wheels to turn in one direction, whilst extension of the second cylinder and retraction of the first cylinder causes the steered wheels to turn in the opposite direction. In this case, fluid outputs of the hydro-mechanical steering unit 6 and/or the electrically controlled hydraulic valve 26 are connected to the chambers in the hydraulic steering cylinders in a crossover manner as is known in the art.

The steering system 1 also includes a control unit 21 comprising a controller or processor 22 and memory 23. The controller 22 is configured to receive and process sensor signals/data, including signals/data representative of an angular position $\Omega$ (also referred to as D) of the steering wheel 2, an angular position $\alpha$ (also referred to as L) of the steered wheel 14, 16, and vehicle speed.

As shown in FIG. 2, the steering system 1 may also comprise an electric motor 5. The motor 5 is arranged to selectively control actuation of the hydro-mechanical steering unit 6 in order to steer the vehicle 100. The controller 22 may be configured to control the motor 5 based on user inputs received via a user interface 24. For example, the motor 5 can be controlled to actuate the hydro-mechanical steering unit 6 in order to provide remote control of the vehicle steering, or automated steering guidance. The motor 5 can alternatively/additionally be arranged to provide a haptic force feedback function to the steering wheel 2 (e.g. to vibrate the steering wheel 2 to provide feedback such as a warning).

The steering system 1 includes a speed sensor 17 which is arranged to sense the speed of the vehicle and to send a speed signal indicating the sensed speed to the controller 22.

The steering system 1 also comprises a steering wheel sensor 4 and a steered wheel sensor 18. The steering wheel sensor 4 is arranged to continuously sense the angular position of the steering wheel 2, and to send data representing the steering wheel angle $\Omega$ to the control unit 21. The steered wheel sensor 18 continuously senses an angular position $\alpha$ of at least one of the steered wheels 14, 16, and sends the sensed information to the control unit 21. The steering wheel angle data and steered wheel angle data received from the sensors can be stored in the memory 23.

In one embodiment, the control unit 21 is an ECU comprising one or more controllers or processors 22, input/output (I/O) interface(s), and the memory 23, all coupled to one or more data busses. The memory 23 may include any one or a combination of volatile memory elements (e.g., random-access memory RAM, such as DRAM, and SRAM, etc.) and non-volatile memory elements (e.g., ROM, hard drive, tape, CDROM, etc.). The memory 23 may store a native operating system, one or more native applications, emulation systems, or emulated applications for any of a variety of operating systems and/or emulated hardware platforms, emulated operating systems, etc. In one embodiment the memory comprises an operating system and software for carrying out the misalignment correction procedure. It should be appreciated by one having ordinary skill in the art that in some embodiments, additional or fewer software modules (e.g., combined functionality) may be employed in the memory 23 or additional memory. In some embodiments, a separate storage device may be coupled to the data bus, such as a persistent memory (e.g., optical, magnetic, and/or semiconductor memory and associated drives).

The controller 22 may be embodied as a custom-made or commercially available processor, a central processing unit (CPU) or an auxiliary processor among several processors, a semiconductor based microprocessor (in the form of a microchip), a macro processor, one or more application specific integrated circuits (ASICs), a plurality of suitably configured digital logic gates, and/or other well-known electrical configurations comprising discrete elements both individually and in various combinations to coordinate the overall operation of the control unit 21.

In use, the steering wheel 2 is rotated by a user to generate a steering demand for steering the steered wheels 14 and 16. The rotational movement of the steering wheel 2 is transmitted to the hydro-mechanical steering unit 6. The hydro-mechanical steering unit 6 has a first fluid output connected to the first hydraulic line 9 and a second fluid output connected to the second hydraulic line 10; it supplies fluid from the tank 8 to the to the first and second hydraulic lines 9, 10 in order to steer the steered wheels 14, 16. The hydraulic lines 9 and 10 are coupled to the steering cylinder 11 so that pressure of the hydraulic lines 9, 10 determines the position of the piston 12. Movement of the piston 12, in response to a change in pressure at the hydraulic lines 9, 10, exerts a steering force on the steering arrangement 25 thereby turning the steered wheels 14, 16. Pressure sensors 19, 20 are arranged to sense the pressure of the hydraulic fluid in the hydraulic lines 9, 10 and to communicate the sensed pressure values to the control unit 21.

The electrohydraulic valve 26 is arranged between the hydro-mechanical steering unit 6 and the hydraulic steering actuator. The electrohydraulic valve 26 can be electrically actuated, by the controller 22, to control the delivery of fluid from the hydro-mechanical steering unit 6 to the hydraulic steering actuator. By controlling output of fluid to the hydraulic steering actuator via the electrohydraulic valve 26, it is possible to control the pressure of the first and second hydraulic lines 9, 10 and thereby control the steering arrangement 25 via the piston 12. It is therefore possible to alter the primary steering ratio $R_p$ of the steering system 1 by adjusting the supply of fluid from the orbital 6 to the first and second hydraulic lines 9, 10 using the electrohydraulic valve 26. Increasing the supply of fluid lowers the primary steering ratio $R_p$, while decreasing the supply of fluid increases the primary steering ratio $R_p$. The controller 22 is configured to control the vehicle 100 to operate at a variable primary steering ratio $R_p$, which it determines and adapts based on the vehicle speed. In this way, the steering system 1 can provide adaptive control of the primary steering ratio with vehicle speed to maximize stability and/or maneuverability. As described above, while adapting the primary steering ratio $R_p$ may provide an improved driving experience in terms of maintaining stability and maneuverability at different speeds, it can lead to misalignment between the steering wheel 2 and the steered wheels 14, 16.

The controller 22 analyses the angular position of the steering wheel 2 and the actual angular position of the steered wheels 14, 16 as detected by the sensor 18 to determine if there is an angular misalignment between the angular position of the steering wheel 2, and the angular position L of the steered wheels 14, 16. The controller 22 may determine that there is an angular misalignment if the actual angular position L of the steered wheels 14, 16 is different from the angular position the steered wheels 14, 16 would be expected to be in dependent on the angular position D of the steering wheel 2 and the current primary steering ratio $R_p$. The angular position the steered wheels 14, 16 would be expected to be in dependent on the angular position D of the steering wheel 2 and the current primary steering ratio $R_p$ is referred to as an "aligned angular position", L*, of the steered wheels. The controller 22 may determine the aligned angular position L* of the steered wheels 14, 16 by calculating the product of the sensed angular position of the steering wheel 2 and the current primary steering ratio $R_p$. Both the magnitude and direction of the misalignment are determined. If the difference between the actual and aligned angular positions of the steered wheels 14, 16 is within an acceptable range (e.g. ±5 degrees) of the sensed angular position of the steering wheel 2, it may be determined that the steered wheels 14, 16 and the steering wheel 2 are aligned. If the difference between the actual and aligned angular positions of the steered wheels 14, 16 is outside of the acceptable range, it may be determined that the steered wheels 14, 16 and the steering wheel 2 are misaligned.

In case of a misalignment, the controller 22 carries out a realignment procedure in which the steering ratio is changed from the primary steering ratio $R_p$ to a compensated steering ratio $R_c$ to reduce the angular misalignment between the steered wheels 14, 16 and the steering wheel 2 when the steered wheels 14, 16 are turned in response to a steering demand $\Delta\Omega$. The basic principles of the realignment procedure will now be described in simple terms before a more detailed explanation of embodiments for carrying out the realignment procedure in practice.

In response to a steering demand $\Delta\Omega$ (i.e., a rotation of the steering wheel through a turning angle $\Delta\Omega$) the controller 22 determines an appropriate rotation angle $\Delta\alpha$ of the steered wheels (i.e., the angle the steered wheels should be rotated through also denoted as the turning angle) to meet the steering demand $\Delta\Omega$ at the primary steering ratio $R_p$ applicable at the time. This will be referred to as the rotation angle $\Delta\alpha$ associated with the steering demand $\Delta\Omega$. In order to reduce any misalignment between the steered wheels 14, 16 and the steering wheel 2, the rotation angle $\Delta\alpha$ of the steered wheels 14, 16 associated with the steering demand $\Delta Q$ is either extended or shortened to provide a compensated rotation angle $\Delta\alpha_{comp}$. The controller determines a compensated steering ratio $R_c$ required to cause the steered wheels 14, 16 to be rotated through the compensated rotation angle $\Delta\alpha_{comp}$ in response to the steering demand $\Delta\Omega$ and regulates the electrohydraulic valve 26 appropriately to provide the compensated steering ratio $R_c$ and move the steered wheels 14, 16 by the compensated rotation angle $\Delta\alpha_{comp}$.

Whether the rotation angle $\Delta\alpha$ of the steered wheels 14, 16 associated with the steering demand $\Delta\Omega$ is extended or shortened to reduce the misalignment between the steered wheels 14, 16 and the steering wheel 2 depends on whether the direction of turn required by the steering demand $\Delta\Omega$ has the effect of rotating the steered wheels from their initial actual angular position L in a direction towards or away from the aligned angular position L* of the steered wheels. If the direction of turn moves the steered wheels 14, 16 in a direction towards the aligned angular position L*, the steered wheels can be said to be "behind the aligned angular position L*" relative to the direction of turn. If the direction of turn moves the steered wheels 14, 16 in a direction away from the aligned angular position L*, the steered wheels can be said to be "ahead of the aligned angular position L" relative to the direction of turn. If the steered wheels 14, 16 are behind the aligned angular position L*, the rotation angle $\Delta\alpha$ the steered wheels are moved through is increased to reduce misalignment. If the steered wheels 14, 16 are ahead of the aligned angular position L*, the rotation angle $\Delta\alpha$ the steered wheels are moved through is shortened or reduced to reduce misalignment.

Figure 3A:
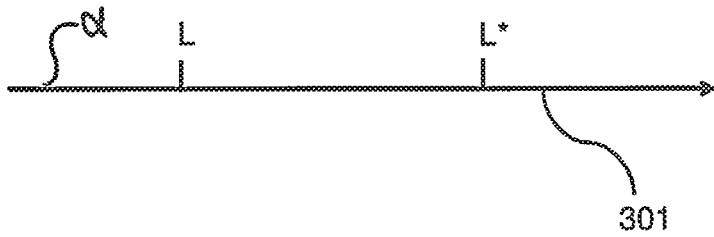
FIGS. 3A and 3B illustrate how the relative position of the current angular position, L, of the steered wheel and the aligned angular position, L*, of the steered wheel changes in dependence on the direction of turn.
Figure 3B:
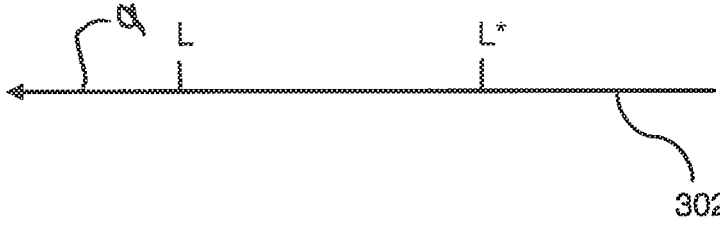

FIGS. 3A and 3B illustrate how to determine whether the steered wheels 14, 16 are ahead of or behind the aligned angular position L* in dependence on the direction of turn. FIGS. 3A and 3B illustrate an example where the aligned angular position L* is offset clockwise (when viewed from above) from the actual angular position L as shown. In this example, the steered wheels 14, 16 would have to be rotated clockwise to reduce the angular misalignment between the steered wheels 14, 16 and the steering wheel 2. It should be noted that the current and aligned angular positions, L and L*, are the same in FIGS. 3A and 3B.

FIG. 3A illustrates a situation where the steering wheel 2 has been turned clockwise (to the right) to generate a steering demand $\Delta\Omega$, the direction of turn being indicted by arrow 301. This requires the steered wheels 14, 16 to be rotated clockwise from their initial angular position L by the rotation angle $\Delta\alpha$ associated with the steering demand $\Delta\Omega$. The direction of turn in this case would cause the steered wheels 14, 16 to be rotated from their initial angular position L in an angular direction towards the aligned angular position L*. In these circumstances, the actual angular position L is said to be behind the aligned angular position L* relative to the direction of turn since the actual angular position L of the steered wheels 14, 16 will always lag behind the aligned angular position L* if the steered wheels 14, 16 are moved by the rotation angle $\Delta\alpha$ associated with the steering demand $\Delta\Omega$ at the primary steering ratio $R_p$. In these circumstances, to reduce the misalignment between the steering wheel 2 and the steered wheels 14, 16 it is necessary rotate the steered wheels 14, 16 by a compensated rotation angle $\Delta\alpha_{comp}$ which is greater than the rotation angle $\Delta\alpha$ required by the steering demand $\Delta\Omega$ so that the steered wheels 14, 16 effectively catch up with the angular position of the steering wheel 2.

In FIG. 3B the starting positions of the initial angular position L and the aligned angular position L* of the steered wheels are the same as for FIG. 3A but in this case the steering wheel 2 has been turned counter-clockwise to generate a steering demand ΔΩ in the opposite direction as indicated by the arrow 302. In these circumstances, the current angular position L is said to be ahead of the aligned angular position L* since the current angular position L will always remain ahead of the aligned angular position L* if the steered wheels 14, 16 are moved by a rotation angle Δα associated with the steering demand ΔΩ at the primary steering ratio $R_p$. In these circumstances, to reduce the misalignment between the steering wheel 2 and the steered wheels 14, 16 it is necessary to rotate the steered wheels 14, 16 by a compensated rotation angle $Δα_{comp}$, which is less than the angle of rotation Δα required by the steering demand ΔΩ.

Looked at this another way, if the direction of turn has the effect of moving the steered wheels 14, 16 from their initial angular position L in an angular direction which is towards the aligned angular position L* (i.e., in the same direction as is required to reduce the misalignment) the misalignment is reduced by moving the steered wheels 14, 16 by an angle $Δα_{comp}$ greater than that required by the steering demand ΔΩ. However, if the direction of turn has the effect of moving the steered wheels 14, 16 from their initial angular position L in an angular direction which is away from the aligned angular position L* (i.e. in the angular direction which is opposite to that required to reduce misalignment) the misalignment is reduced by moving the steered wheels 14, 16 by an angle $Δα_{comp}$ less than that required by the steering demand ΔΩ.

The amount by which the rotation angle of the steered wheels 14, 16 Δα associated with the steering demand ΔΩ is extended or reduced is determined based of the degree of angular misalignment Om between the actual angular position L of the steered wheels 14, 16 and the aligned angular position of the steered wheels L* and is referred to as a compensation angle $θ_c$. The compensation angle $θ_c$ is usually equal to or less than the determined angular misalignment Om between the steered wheels 14, 16 and the steering wheel 2. The compensation angle $θ_c$ is calculated by determining the product of the determined angular misalignment $θ_m$ and a compensation factor k wherein k≤1 (see Equation 1).

$$θ_c = k \cdot θ_m \qquad \text{Equation 1}$$

Abrupt changes in the steering ratio can be uncomfortable for the user. Using the compensation factor k, the compensation angle $θ_c$ can be controlled to take a value that is a fraction of the determined angular misalignment $θ_m$ (i.e. the compensation angle may be controlled to be less than the determined angular misalignment). In this way, it is possible to reduce the misalignment incrementally without requiring sudden changes to the steering ratio. Reducing misalignment in this way can help to provide the user with a smooth driving experience.

When the steered wheels are behind the aligned angular position L* in the direction of turn, the compensation angle $θ_c$ is added to the rotation angle Δα associated with the steering demand ΔΩ to produce the compensated rotation angle $Δα_{comp}$ which is larger than the rotation angle Δα associated with the steering demand ΔΩ and the steered wheels are moved though the compensated rotation angle $Δα_{comp}$. When the steered wheels are ahead of the aligned angular position L* in the direction of turn, the compensation angle $θ_c$ is subtracted from the rotation angle Δα associated with the steering demand ΔΩ to produce a compensated rotation angle $Δα_{comp}$ which is smaller than the rotation angle Δα associated with the steering demand ΔΩ and the steered wheels are moved though the compensated rotation angle $α_{comp}$.

The controller 22 adjusts the steering ratio to a compensated steering ratio $R_c$, to cause the steered wheels 14, 16 to rotate through the compensated rotation angle $Δα_{comp}$ to a compensated steering angular position LF. This compensated angular position LF of the steered wheels 14, 16 is equal to the initial angular position Li, the rotation angle Δα associated with the steering demand ΔΩ and the compensation angle θc (see Equation 2).

$$LF = Li + ΔΩ ± θ_c \qquad \text{Equation 2}$$

The realignment procedure may be carried out repeatedly in an iterative manner whenever a steering demand ΔΩ is detected until it is determined that the misalignment has been cancelled. The controller 22 continuously monitors the angular positions of the steering wheel 2 and the steered wheels 14, 16 and speed of the vehicle and determines whether there is a steering demand ΔΩ and any misalignment. In practice, the control system may operate a rate of e.g. 10-50 Hz. At least whilst there is a steering demand, the controller 22 may carry out the realignment procedure at each interval (step), so as to effectively continuously adjust the steering ratio based on any misalignment between the steering wheel 2 and the steered wheels 14, 16.

The value of the compensation factor k may be varied to regulate how smoothly the steering ratio changes to reduce misalignment depending on the circumstances. The value of the compensation factor k may be determined based on a compensation vehicle parameter. For example, the compensation factor k may vary as a function of one or a combination of the following compensation vehicle parameters: the current steering wheel angle Ω, the current angle of the steered wheel α, the amount of misalignment, the turning direction of the steering demand, the turning angle ΔΩ of the steering demand, the rotation angle Δα of the steered wheels resulting from the steering demand at the current steering ratio, vehicle speed, change in vehicle speed, rotational speed of the steering wheel, the current steering ratio, and/or an operating mode of the vehicle. The compensation factor k may also be varied in dependence on whether the steered wheels 14, 16 are behind or ahead of the aligned angular position L* in relation to the direction of turn.

Where the compensation factor is determined based on the steering angle α of the steered wheels, the compensation factor may be determined as follows, where α is the steering angle of the steered wheels 14, 16, and where α1 and α2 represent threshold values and $k_{α2}$ is a value≤1:

$$k_α = \begin{cases} 1; & \text{if } |α| \le α_1 \\ k_{α2}; & \text{if } |α| \ge α_2 \\ 1 + \dfrac{α - α_1}{α_2 - α_1} \cdot (k_{α2} - 1); & \text{otherwise} \end{cases}$$

When the compensation factor varies as a function of the vehicle speed, it may be varied as follows, wherein v is the speed of the vehicle 100, $v_1$ and $v_2$ are threshold values and $k_{v2}$ is a value≤1:

$$k_v = \begin{cases} 1; & \text{if } |v| \le v_1 \\ k_{v_2}; & \text{if } |v| \ge v_2 \\ 1 + \dfrac{v - v_1}{v_2 - v_1} \cdot (k_{v_2} - 1); & \text{otherwise} \end{cases}$$

If the compensation factor is varied as a function of the angular misalignment, it can be varied as follows, wherein $\alpha_{diff}$ is the angular misalignment, $\alpha_{diff1}$ and $\alpha_{diff2}$ are threshold values and $k_{diff2} \le 1$.

$$k_{Diff} = \begin{cases} 1; & \text{if } |\alpha_{Diff}| \le \alpha_{Diff1} \\ k_{Diff2}; & \text{if } |\alpha_{Diff}| \ge \alpha_{Diff2} \\ 1 + \dfrac{\alpha_{Diff} - \alpha_{Diff1}}{\alpha_{Diff2} - \alpha_{Diff1}} \cdot (k_{Diff2} - 1); & \text{otherwise} \end{cases}$$

If the compensation factor is determined as a function of more than one of the compensation vehicle parameters, it may be determined by calculating the product of multiple parameter-specific compensation factors ($k_\alpha$ $k_v$ . . . , etc.)

The operating mode of the vehicle may indicate whether the user wishes to prioritise reducing the misalignment quickly, or user comfort. For example, in one mode of operation—the "priority-neutral mode"—reducing misalignment is prioritized, and more abrupt changes in the steering ratio are deemed acceptable. Accordingly, in this mode, a relatively high compensation factor may be adopted, e.g. larger than 0.51, for example 0.8. In another exemplary operation mode—the "priority-smooth mode"—maintaining a smooth steering ratio is prioritised. To achieve this, the compensation factor may be maintained at a value that is lower than the compensation factor used for the "priority-neutral mode", e.g. less than 0.50. The operating mode of the vehicle may be selected and input by the user.

The compensation factor may be determined based on the elapsed time since a change in operation mode occurred. For example, the compensation may vary based on the amount of time that has passed since automatic guidance mode was switched off, wherein t is the elapsed time, $t_1$ and $t_2$ are threshold values, and $k_2 \le 1$.

$$k_t = \begin{cases} 1; & \text{if } t \ge t_2 \\ k_{t_2}; & \text{if } t \le t_1 \\ 1 + \dfrac{t_2 - t}{t_2 - t_1} \cdot (k_{t_1} - 1); & \text{otherwise} \end{cases}$$

The controller 22 may be configured to control the compensation factor k in order to maintain the compensation angle below a maximum allowed value for the compensation angle. The maximum allowed value for the compensation angle (i.e. the upper compensation limit) may vary based on a vehicle parameter (such as one of the vehicle parameters listed above).

For example, the controller 22 may be configured to control the compensation factor k to maintain the compensation angle $\theta_c$ to a value that is within a predetermined range of the angle of rotation $\Delta\alpha$ of the steered wheels 14, 16 according to the steering demand, at the current steering ratio, e.g. within 100%, within 75% or within 50% of the angle of rotation $\Delta\alpha$ of the steered wheels 14, 16. For example, if the steering demand at the primary steering ratio $R_p$ corresponds to a rotation $\Delta\alpha$ of the at least one steered wheel 14, 16 by 10 degrees, and the angular misalignment is equal to 20 degrees, the controller 22 may determine that the compensation factor is equal to or less than 0.5, in order to limit the compensation angle to a value that is less than or equal to 50% of the value of the angle of rotation of the steered wheels 14, 16 according to the steering demand. Thus, a compensated rotation angle of less than or equal to 1.5 of the angle of rotation can be achieved if the compensation angle is added to the angle of rotation, or a compensated rotation angle of more than or equal to 0.5 of the angle of rotation can be achieved if the compensation angle subtracted from the angle of rotation.

In another example, the compensation factor is determined as a function of the angle of rotation $\Delta\alpha$ of the steered wheels 14, 16 according to the steering demand. In particular, the inventors have realized that users can tolerate a proportionally larger adjustment at lower rotation angles $\Delta\alpha$.

The compensation factor k can be varied depending on whether the actual angular position L of the steered wheels 14, 16 is ahead of or behind the aligned angular position L*, as exemplified in the examples below.

TABLE 1

| Examples of compensation factor k as a function of current angular position, aligned angular position and turning direction | | |
|---|---|---|
| Example | L ahead of L* | L behind L* |
| 1 | ≤0.85 | ≤0.5 |
| 2 | ≤0.33 | ≤0.2 |
| 3 | ≤0.17 | ≤0.10 |

Figure 4:
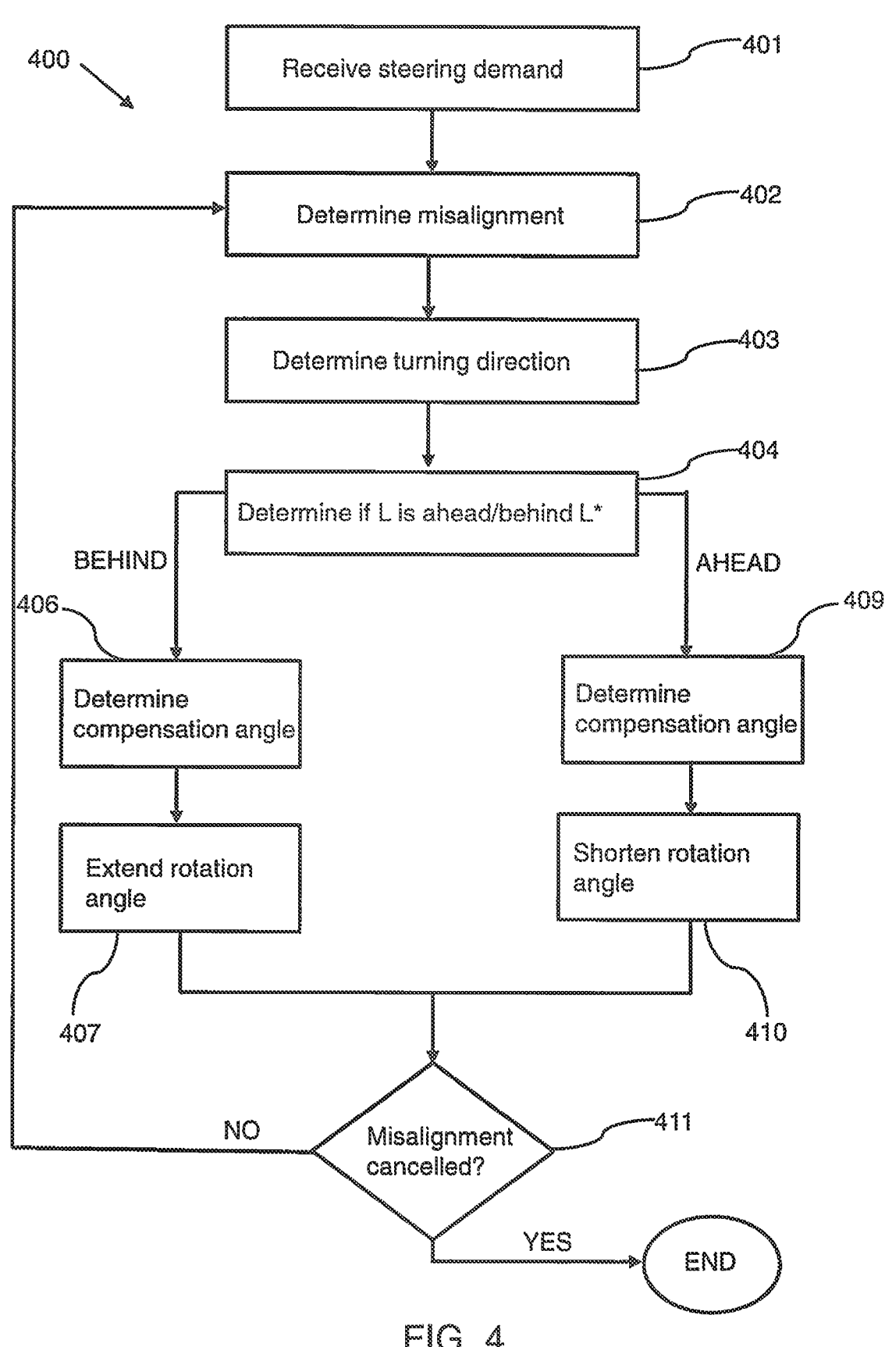
FIG. 4 illustrates a method of controlling an electro-hydraulic steering system.

FIG. 4 illustrates a method 400 according to an embodiment of the invention.

In an initial step 401, the controller 22 receives a steering demand $\Delta\Omega$ from the steering wheel 2. In response to the steering demand, the controller 22 determines a turning angle by which the user has rotated the steering wheel 2. For example, if the steering wheel 2 has been rotated in a clockwise direction from −15° to 5°, the steering demand indicates that the turning angle is 20°.

At step 402, to controller determines the amount of misalignment between the current angular position, $D_t$, of the steering wheel 2 and the current angular position L of the steered wheels 14, 16. The amount of misalignment is determined by comparing the current angular position L of the steered wheels 14, 16 as detected by a sensor 18 with the aligned angular position L* of the steered wheels 14, 16. Alternatively, the controller may retrieve from memory a previously stored value for the misalignment determined say at the previous interval. Where the controller is continuously monitoring and determining misalignment, using a value for the misalignment determined at a previous interval may be acceptable as errors between intervals will be small.

If the controller 22 determines that the steering wheel 2 and the at least one steered wheel 14, 16 are misaligned, the method proceeds to step 403. At step 403, the controller 22 determines the turning direction, e.g. by determining whether the steering demand corresponds to a clockwise or counter-clockwise rotation of the steering wheel 2.

Next, at step 404, the controller 22 determines if the actual angular position L of the steered wheels 14, 16 is ahead of or behind the aligned angular position L* in relation to the direction of turn as previously described.

If it is determined that L is behind L*, the method proceeds to step 406. If it determined that L is ahead of L*, the method proceeds to step 409. At both steps 406 and 409, the controller 22 calculates the compensation angle $\theta_c$. The compensation angle $\theta_c$ may be calculated by determining the product of the angular misalignment between L and L* and the compensation factor k.

Once the compensation angle $\theta_c$ has been determined, the steering system 1 is controlled to rotate the steered wheels 14, 16 by a compensated rotation angle $\Delta\alpha_{comp}$. Which as described can be calculated by adding the compensation angle $\theta$ to the rotation angle $\Delta\alpha$ if L is behind L*, or by subtracting the compensation angle $\theta_c$ from the rotation angle $\Delta\alpha$ associated with the steering demand if L is ahead L*. If it is determined that the current angular position L of the steered wheels 14, 16 is behind the aligned angular position L*, the rotation angle $\Delta\alpha$ is extended by decreasing the steering ratio to the compensated steering ratio $R_c$ (step 407). If it is determined that the current angular position L of the steered wheels 14, 16 is ahead the aligned angular position L*, the rotation angle $\Delta\alpha$ is shortened by increasing the steering ratio to the compensated steering ratio $R_c$ (step 410).

The controller 22 causes the steering system 1 to rotate the steered wheels 14, 16 by the compensated rotation angle $\Delta\alpha_{comp}$ by changing the steering ratio to a value, the compensated steering ratio $R_c$, which is implemented by using the valve 26 to adjust the amount of oil fed to the steering actuator (cylinder 11 and piston 12) from the orbital for rotating the steered wheels 14, 16 by the compensated rotation angle $\Delta\alpha_{comp}$. In this way, misalignment between the steered wheels 14, 16 and the steering wheel 2 is reduced.

As shown in FIG. 4, the realignment procedure can be performed iteratively. After the steered wheels 14, 16 has been turned by the compensated rotation angle $\Delta\alpha_{comp}$, the controller 22 determines whether the at least one steered wheel 14, 16 and the steering wheel 2 are aligned. If it is determined that the misalignment has been cancelled, the realignment procedure ends. If it is determined that the at least one steered wheel 14, 16 and the steering wheel 2 are still misaligned, the realignment process repeats in order to further reduce or to remove the misalignment. It may be determined that the misalignment has been cancelled if the amount of misalignment is lower than a threshold value. The threshold value could be, for example, less than 5 degrees. However, it will be appreciated with that specific value of the threshold number could be different or that a threshold value may not be used.

The realignment procedure may be carried out multiple times during a steering action. For instance, if a user rotates the steering wheel by a turning angle of twenty degrees, say from a steering angle of −15° to a steering angle of 5°, the controller may continuously determine the amount of misalignment between the steered wheels 14, 16 and the steering wheel 2 during the turning action and adjust the steering ratio with each iteration of the realignment procedure.

Figure 5:
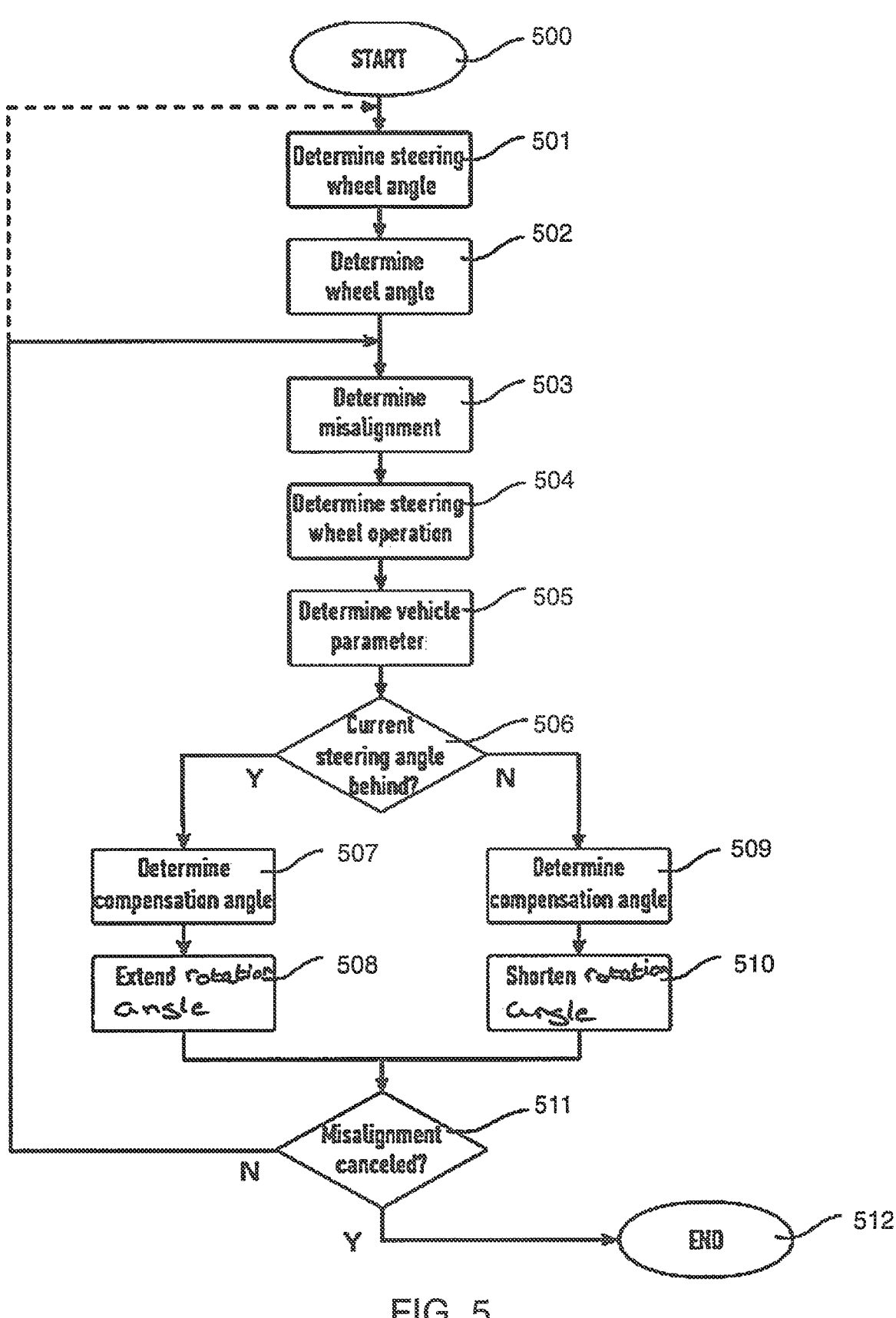
FIG. 5 illustrates a method of operating an electro-hydraulic steering system.

FIG. 5 shows another method of controlling the steering system 1 similar to FIG. 4 but including the additional step 505 of determining a compensation vehicle parameter. In the embodiment shown in FIG. 5, compensation vehicle parameter is determined and the compensation factor k is selected at least partly in dependence on the determined compensation vehicle parameter.

Figure 6:
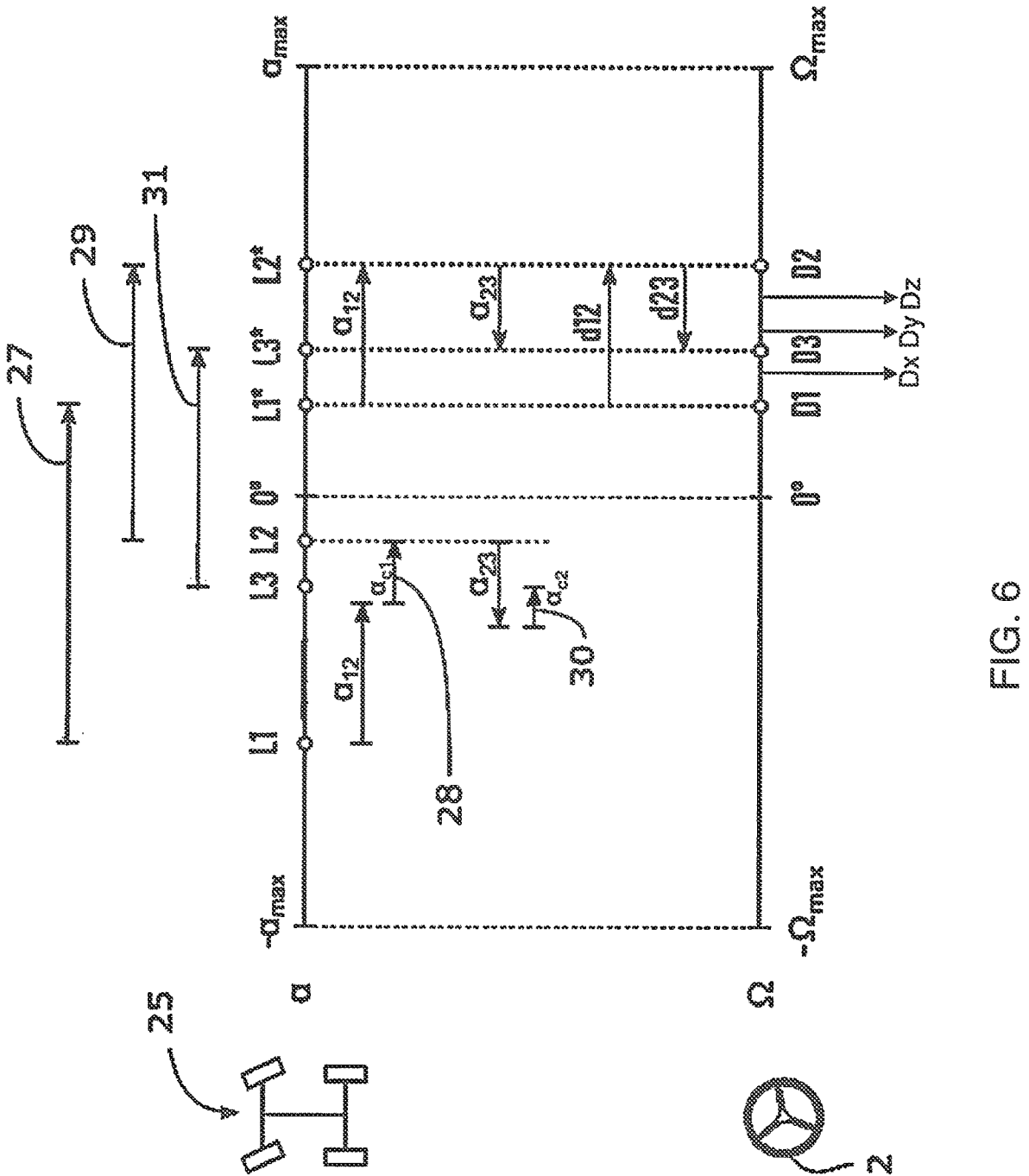
FIG. 6 illustrates the operation of controlling an electro-hydraulic steering system according to the method of FIG. 4 or FIG. 5.

FIG. 6 illustrates operation the steering system 1 according to the methods illustrated in FIG. 4 or FIG. 5. FIG. 6 illustrates a situation where the position of the steering wheel 2 is misaligned with respect to the angle of rotation $\alpha$ of the steered wheels 14, 16. In the example shown, the steered wheels 14, 16 are initially positioned in an angle of rotation $\alpha$=L1 whilst the steering wheel 2 is positioned in a steering wheel angle $\Omega$=D1. L1* indicates the aligned angular position of the steered wheels, this being the angular position $\alpha$ at which the steered wheels 14, 16 would be aligned with the steering wheel at its current steering angle $\Omega$=D1 at the current primary steering ratio $R_p$. The difference between the actual and aligned angular positions L1, L1* of the steered wheels defines the amount of misalignment between the steering wheel 2 and the steered wheels 14, 16. This is represented by arrow 27 which also indicates the direction of misalignment.

With reference to the method steps of FIG. 5, at step 501, the control unit 21 receives and determines the angular position D1 representing the current steering wheel angle, $\Omega$. At step 502, the control unit 21 receives and determines the angular value L1 representing the current angle of rotation $\alpha$ of the steered wheels 14, 16. Next, at step 503, the control unit 21 determines the amount and direction of misalignment 27 based on the current steering wheel angle $\Omega$=D1, the current angle of rotation $\alpha$=L1 and the steering ratio. The amount and direction of misalignment is determined by comparing the current angular position L1 of the steered wheels 14, 16 as detected by a sensor 18 with the aligned angular position L1* of the steered wheels 14, 16 and is calculated based on the angular position D1 of the steering wheel 2 and the current steering ratio.

At step 504, a steering demand is detected in response to rotation of the steering wheel 2. As illustrated in FIG. 6, in this example a user initially rotates the steering wheel 2 through a turning angle d12 from $\Omega$=D1 to $\Omega$=D2. The controller 22 receives information, from a steering wheel sensor 4, indicating that the steering wheel 2 has been rotated and determines the turning direction as well as the demanded rotation angle $\Delta\alpha$, i.e., the angle of rotation of the steered wheels 14, 16 associated with the steering demand, according to the primary steering ratio $R_p$.

Next, the controller 22 determines an additional vehicle parameter for calculating the compensation factor k and hence the compensation angle $\theta_c$ (step 505).

At step 506, the controller 22 determines if the current angular position L1 of the steered wheels is ahead or behind the aligned angular position L1* relative to the direction of turn. As shown in FIG. 6, since the turning direction from D1 to D2 is clockwise, L1 is behind L1*.

Since the current angle of rotation L1 of the steered wheels is determined to be behind the aligned angular position L1*, the method proceeds to steps 507 and 508. At step 507 the controller 22 determines a compensation angle $\theta_c$ analogously to step 406 of the method of FIG. 4, applying the compensation factor k determined in dependence on the vehicle parameter determined at step 505.

At step 508, the controller 22 adds the compensation angle $\theta_c$ ($\alpha_{c1}$) determined in step 507 to the demanded rotation angle $\Delta_\alpha$ ($\alpha_{12}$) to derive an extended, compensated rotation angle $\Delta\alpha_{comp}$ by which the steered wheels are turned. This is indicated by arrow 28 in FIG. 6 and is analogous to step 407 in the method of FIG. 4. That is, the controller 22 causes the steered wheels to be rotated by a compensated rotation angle $\Delta\alpha_{comp}$ ($\alpha_{12}+\alpha_{c1}$) which is extended in comparison to the rotation angle @12 that would have been required to meet the steering demand d12. Accordingly, instead of the steered wheels 14, 16 rotating by the angle $\alpha_{12}$ ($\Delta\alpha$), they are rotated by the compensated rotation angle $\alpha_{comp}$=$\alpha_{12}+\alpha_{c1}$ so that the steered wheels move to a new angular position L2. To extend the demanded rotation angle, the controller 22 causes the electro-hydraulic valve 26 to increase the amount of fluid delivered to the hydraulic lines 9, 10 and so decrease the steering ratio $R_c$.

At step 511, the controller 22 determines if the misalignment has been cancelled. As shown in FIG. 6, the steered wheels 14, 16 are positioned now at $\alpha=L2$, while the steering wheel 2 is positioned at angle $\Omega=D2$. The aligned angular position of the steered wheels for the steering wheel position D2 at the primary steering ratio is labelled L2*. As illustrated by arrow 29, there is still a misalignment between the steering wheel 2 and the steered wheels but this is reduced compared to the previous misalignment as indicated by arrow 27.

Since the steered wheels 14, 16 and the steering wheel 2 are not aligned, the controller 22 repeats the procedure from step 503 or 504. As indicated by the dashed arrow in FIG. 5, the procedure could alternatively repeat starting from step 501.

In the second iteration, at step 503 the amount of misalignment based on the current position D2 of the steering wheel 2 is determined or recalled from memory from the previous step 511.

The method proceeds to step 504 to detect a steering demand generated by a rotation of the steering wheel 2 by d23 from $\Omega=D2$ to $\Omega=D3$. As illustrated in FIG. 6, this steering demand d23 is in the opposite direction compared to the previous steering demand. At step 505, the controller 22 determines one or more additional vehicle parameters for calculating the compensation factor k and the compensation angle, as described above.

At step 506, the controller 22 determines if the current angular position L2 of the steered wheels 14, 16 is behind the aligned angular position L2* of the steered wheels 14, 16. As shown in FIG. 6, the current angular position L2 is ahead of the aligned angular position L2* in the direction of steering, which in this case is counter-clockwise. Accordingly, the controller 22 continues to step 509 to determine a compensation angle $\theta_c$ analogously to step 409 of the method of FIG. 4.

At step 510, the controller 22 subtracts the compensation angle $\theta_c$ ($\alpha_{c2}$) calculated in step 509 from the demanded rotation angle $\Delta\alpha$ ($\alpha_{23}$) associated with the steering demand to determine a reduced, compensated rotation angle $\Delta\alpha_{comp}$ by which the steered wheels are turned. Thus the compensated rotation angle $\Delta\alpha_{comp}=\Delta\alpha-\theta_c$ or $\alpha_{23}-\alpha_{c2}$. This is indicated by line 30 and is analogous to step 410 of the method of FIG. 4. That is, the controller 22 causes the steered wheels 14, 16 to be rotated by a compensated angle $\Delta\alpha_{comp}$ which is reduced in comparison to the rotation angle $\alpha_{23}$ that would have been required to meet the steering demand d23. To reduce the angle through which the steered wheels are rotated, the controller 22 causes the electro-hydraulic valve 26 to reduce the amount of fluid delivered to the hydraulic lines 9, 10 and so effectively increase the steering ratio. At the end of the steering maneuver, the steered wheels 14, 16 are positioned at L3, with the steering wheel 2 at D3.

The controller proceeds to step 511 and re-calculates the misalignment between the steered wheels and the steering wheel. With the steering wheel at angular position D3, the aligned angular position of the steered wheels at the primary steering ration $R_p$ is indicated at L3*. The misalignment between the steered wheels 14, 16 and the steering wheel 2 is shown by the arrow 31 extending between L3 and L3* and has been further reduced but not eliminated. Accordingly, the controller 22 repeats the procedure, from step 503. As indicated by the dashed arrow in FIG. 5, the procedure could alternatively repeat starting from step 501.

The controller 22 may continue to repeat the method, reducing the misalignment with every cycle, until it determines that there is no longer any misalignment or to bring the misalignment within an acceptable tolerance. In a modification, step 511 may be omitted and the procedure simply be repeated on a continuous basis whist the vehicle is operational provided the realignment procedure has not been stopped, say due to the vehicle entering a particular mode of operation where realignment is not desirable. In this case, realignment would only take place where a sufficient misalignment is determined in step 503, or step 402 in the case of the method of FIG. 4.

For simplicity, the method of reducing misalignment has been described above with a single realignment procedure being carried out in connection with each of the first steering action (D1–D2) and the second steering action (D2–D3). However, as described above, in an embodiment the controller 22 is substantially constantly monitoring the angular positions of the steering wheel 2, the steered wheels 14, 16 and other parameters such as the speed of the vehicle in order to constantly monitor steering demand and misalignment between the steered wheels and the steering wheel 2 and regulates the electromagnetic valve 26 to adjust the steering ratio in order to meet a steering demand whilst reducing or minimizing misalignment. As noted, the controller 22 and control system may operate at a rate of e.g. 10-50 Hz. Accordingly, within any one steering movement by the driver, the controller may carry out the realignment procedure a number of times, updating the data and recalculating requirements to reduce misalignment at each interval or step. For example, with reference to FIG. 6, during for the steering action D1-D2, the realignment procedure may be carried out with respect to steering wheel positions Dx, Dy, Dz, which correspond to the position of the steering wheel as detected at equally spaced time intervals. Accordingly, the controller 22 can execute the method several times during a steering action to reduce iteratively the misalignment during the steering action. For example, according to an embodiment, the system may be activated by a timer every 10 to 50 milliseconds. Each time the system is activated, new values for the measured variables are determined from the sensors, including the steering wheel position, steered wheel position, vehicle speed, etc. The new values are compared with values from a previous activation which are saved to memory and changes in the variables determined. At each activation the alignment/misalignment between the steering wheel and the steered wheel position is assessed and if it is determined that there is a misalignment and that a steering demand is present, the correction procedure as described is followed to reduce misalignment whilst meeting the steering demand.

Figure 7:
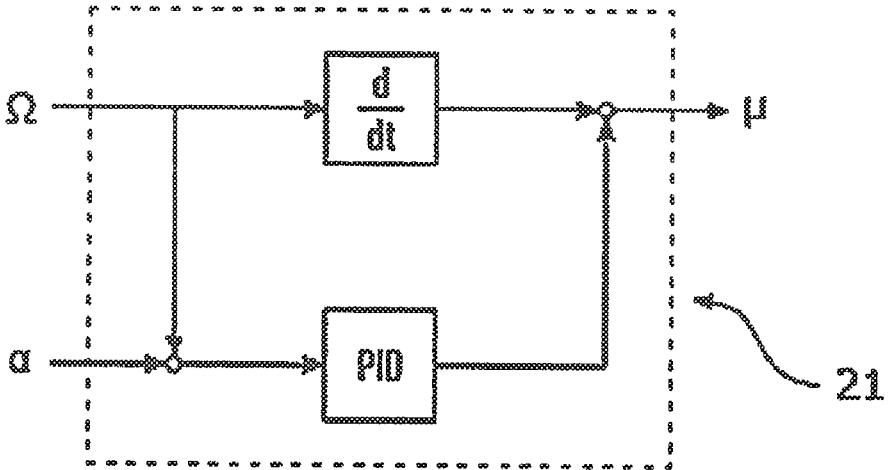
FIG. 7 illustrates a control system for the steering system of FIG. 2.

FIG. 7 shows a control scheme that can be implemented in the control unit 21 to control the valve 26 of FIG. 2. The control unit 21 receives the angle of rotation $\alpha$ of the steered wheels 14, 16 and the steering wheel angle Q of the steering wheel 2 from the sensors 4, 18 respectively. These values can be processed by different controllers, e.g. a derivative controller (D-controller) and a proportional integral derivative (PID) controller, to generate a control signal $\mu$ for the electromagnetic valve 26. As can be seen in FIG. 2, the control unit can also receive additional parameters as the vehicle speed v, the pressure values of the hydraulic lines 9 and 10 and other values received via an interface 24. These additional parameters can also be processed by the controller 22 to generate a control signal μ.

It will be appreciated that the invention is not limited to the above-described embodiments. In particular, modifications to these embodiment can be made without departing from the invention.

While FIG. 2 illustrates an embodiment in which the steering wheel 2 is mechanically coupled to the hydro-mechanical steering unit by the steering column 3, it will be appreciated that the invention is not limited to such arrangements. In particular, the steering system 1 could instead be provided as a steer-by-wire arrangement in which there is no mechanical link between the steering wheel 2 and the hydro-mechanical steering unit 6.

As shown in FIG. 2 the hydro-mechanical steering unit 6 and the electrohydraulic valve 26 may be provided as an integrated unit in which the hydro-mechanical steering unit 6 and the electrohydraulic valve 26 share the same hydraulic connections to the pump 7 and tank 8. Alternatively, the hydro-mechanical steering unit 6 and the electrohydraulic valve 26 may be provided as separate components with separate hydraulic connections to one another.

While FIG. 2 illustrates an embodiment including a motor 5, it will be appreciated that the motor 5 need not be present. Accordingly, in some other embodiments of the invention, the steering system 1 does not include the motor 5.

While the embodiment illustrated in FIG. 2 is described as adapting the primary steering ratio $R_p$ based on the speed of the vehicle, the primary steering ratio $R_p$ may not be adapted based on a vehicle parameter or it may instead be adapted based on a different vehicle parameter. For example, the primary steering ratio $R_p$ may be adapted based on a steering movement of the vehicle e.g. the angle of rotation of the steered wheels 14, 16 (i.e. the angle through which the steered wheels 14, 16 is turned) or the turning angle of the steering wheel 2 (i.e. the angle through which the steering wheel 2 is turned). The primary steering ratio $R_p$ may be adapted based on a combination of vehicle parameters.

While the embodiment illustrated in FIG. 2 includes a vehicle speed sensor 17, it will be appreciated that the sensor may be omitted in some other embodiments. In particular, a vehicle speed sensor 17 is not required for embodiments in which the steering ratio is adapted based on a different vehicle parameter to the speed of the vehicle. When a speed sensor 17 is present, the speed sensor may be any type of sensor capable of sensing the speed of travel of the vehicle. For example, the speed sensor may be an incremental encoder or a Global Navigation Satellite System, GNSS, receiver (in which case speed is calculated based on the position signals of the vehicle).

The realignment procedure may comprise determining whether the current angular position, L, of the steered wheels 14, 16 is ahead of or behind the aligned angular position, L*, of the steered wheels 14, 16. Of course, this may be determined by assessing whether the aligned angular position L* is behind or ahead of the current angular position L.

It will be appreciated that the specific way in which the compensation angle $θ_c$ is implemented can vary. In particular, the compensated steering angle θ, may be determined in a different way to that described by Equation 2. In some embodiments, the sign of the compensation factor k may be controlled based on whether the compensation angle $θ_c$ should extend or reduce the rotation associated with the steering demand. In such an embodiment, the compensated steering angle may be determined as follows;

$$L_F = L_i + θ_s + θ_c \qquad\qquad \text{Equation 3}$$

For example the compensation factor may be determined as follows, wherein $k_{ext} \leq 1$, $k_{red} \leq 1$, $Δα$ is the amount of misalignment, $α_{ideal}$ is the aligned steering angle of the steered wheels 14, 16, and $α_{real}$ is the current steering angle of the steered wheels 14, 16:

$$k_{Sign} = \begin{cases} kext; & \text{if } Δ\propto \, > 0 \text{ and } \propto_{Ideal} > \propto_{Real} \\ -kred; & \text{if } Δ\propto \, > 0 \text{ and } \propto_{Ideal} < \propto_{Real} \\ kext; & \text{if } Δ\propto \, < 0 \text{ and } \propto_{Ideal} < \propto_{Real} \\ -kred & \text{if } Δ\propto \, < 0 \text{ and } \propto_{Ideal} > \propto_{Real} \end{cases}$$

Although in the above-described embodiment the realignment method is triggered by a steering demand, it will be appreciated that the realignment method could be triggered in a different way. For example, the realignment method may be triggered based on a determination that the steering wheel 2 and the steered wheels 14, 16 are misaligned, a change in the vehicle operating mode, or it may be initiated by a user.

It will be appreciated that while it has been described that the controller 22 may determine if a misalignment exists, and continue if it is determined that there is misalignment, the controller 22 may instead be configured to carry out the misalignment method independently of whether a misalignment exists or not.

All references cited herein are incorporated herein in their entireties. If there is a conflict between definitions herein and in an incorporated reference, the definition herein shall control.

What is claimed is:

1. An electro-hydraulic steering system for a vehicle comprising a steered wheel, the electro-hydraulic steering system comprising:

a steering wheel for setting a desired steering angle of the steered wheel;

a hydraulic steering actuator for turning the steered wheel through a rotation angle in response to a steering demand from the steering wheel;

an electrically controlled hydraulic valve arranged to supply pressurized fluid to the hydraulic steering actuator to turn the steered wheel according to a variable steering ratio between the steering wheel and the steered wheel; and a control unit comprising a controller configured to:

receive an angular position (D) of the steering wheel, and an angular position (L) of the steered wheel;

determine an angular misalignment between the angular position (D) of the steering wheel, and the angular position (L) of the steered wheel; and carry out a realignment procedure to reduce the angular misalignment, the realignment procedure comprising:

calculating a compensation angle based on the determined angular misalignment;

controlling the steering ratio of the electro-hydraulic steering system based on the compensation angle by controlling the hydraulic valve to adjust the supply of pressurized fluid to the hydraulic steering actuator.

2. The electro-hydraulic steering system of claim 1, wherein the controller is configured to:

determine an aligned angular position (L*) of the steered wheel in relation to an angular position (D) of the steering wheel; and determine, based on the steering demand, a demanded rotation angle of the steered wheel and a turning direction;

wherein the realignment procedure further comprises:

determining if the angular position of the steered wheel (L) is ahead of or behind the aligned angular position (L*) of the steered wheel in the turning direction; and if the angular position (L) of the steered wheel is ahead of the aligned angular position (L*) of the steered wheel in the tuming direction, adjusting the steering ratio of the electro-hydraulic steering system to reduce the demanded rotation angle of the steered wheel by the compensation angle, so as to rotate the steered wheel by a compensated rotation angle; or if the angular position (L) of the steered wheel is behind the aligned angular position (L*) of the steered wheel in the turning direction, adjusting the steering ratio of the electro-hydraulic steering system to increase the demanded rotation angle of the steered wheel by the compensation angle, so as to rotate the steered wheel by a compensated rotation angle.

3. The electro-hydraulic steering system of claim 1, wherein the realignment procedure further comprises:

determining a demanded rotation angle of the steered wheel based on the steering demand, according to a primary steering ratio $R_p$;

determining a compensated rotation angle, wherein determining the compensated rotation angle comprises combining the demanded rotation angle and the compensation angle; and adjusting the steering ratio to a compensated steering ratio $R_c$ for causing the steered wheel to rotate through the compensated rotation angle in response to the steering demand.

4. The electro-hydraulic steering system of claim 2, wherein calculating the compensation angle comprises determining the product of the angular misalignment and a compensation factor.

5. The electro-hydraulic steering system of claim 4, wherein the controller is configured to apply a first compensation factor if the angular position of the steered wheel (L) is ahead of the aligned angular position (L*) and to apply a second compensation factor if the angular position of the steered wheel (L) is behind the aligned angular position (L*);

wherein the first compensation factor is less than 0.85 and the second compensation factor is less than 0.5; or the first compensation factor is less than 0.33 and the second compensation factor is less than 0.20; or the first compensation factor is less than 0.17 and the second compensation factor is less than 0.10.

6. The electro-hydraulic steering system of claim 4, wherein the realignment procedure further comprises determining the compensation factor based on a compensation vehicle parameter.

7. The electro-hydraulic steering system of claim 6, wherein the compensation vehicle parameter is a turning angle of the steering demand, and the controller is configured to determine the compensation angle by determining an upper compensation limit, wherein the upper compensation limit is a fraction of the rotation angle of the steered wheel according to the turning angle; and the controller is further configured to determine a compensation factor that limits the compensation angle to a value below the upper compensation limit.

8. The electro-hydraulic steering system of claim 1, wherein the controller is configured to determine if the angular misalignment exceeds a threshold value and to only carry out the realignment procedure if the angular misalignment meets or exceeds the threshold value.

9. The electro-hydraulic steering system of claim 1, further comprising a hydro-mechanical steering unit configured to deliver fluid to the hydraulic steering actuator according to the steering demand; wherein the hydraulic valve is configured to adjust the amount of fluid delivered by the hydro-mechanical steering unit to the hydraulic steering actuator according to a compensated steering ratio.

10. The electro-hydraulic steering system of claim 1, further comprising:

a steering wheel sensor for sensing an angular position of the steering wheel;

a steered wheel sensor for sensing an angular position of the steered wheel; and a speed sensor for sensing the speed of the vehicle.

11. An agricultural vehicle comprising the electro-hydraulic steering system of claim 1.

12. A computer implemented method of controlling an electro-hydraulic steering system for a vehicle comprising a steering wheel and a steered wheel, the method comprising:

determining an angular misalignment between the angular position of the steering wheel and the angular position of the steered wheel; and carrying out a realignment procedure, the realignment procedure comprising:

calculating a compensation angle based on the angular misalignment; and outputting a control signal for controlling the steering ratio of the vehicle based on the compensation angle; the method further comprising:

receiving a steering demand for rotating the steered wheel through a rotation angle;

determining a turning direction of the steering demand; and;

determining an aligned angular position (L*) of the steered wheel in relation to an angular position (D) of the steering wheel, wherein the realignment procedure comprises:

determining if an angular position of the steered wheel (L) is ahead of or behind the aligned angular position (L*) of the steered wheel in the turning direction; and if the angular position (L) of the steered wheel is ahead of the aligned angular position (L*) of the steered wheel in the turning direction, adjusting the steering ratio of the electro-hydraulic steering system to decrease the rotation angle of the steered wheel by the compensation angle, so as to rotate the steered wheel by a compensated rotation angle; or if the current angular position (L) of the steered wheel is behind the aligned angular position (L*) of the steered wheel in the turning direction, adjusting the steering ratio of the electro-hydraulic steering system to increase the rotation angle of the steered wheel by the compensation angle, so as to rotate the steered wheel by a compensated rotation angle.

13. The computer-implemented method of claim 12, further comprising:

determining a demanded rotation angle of the steered wheel, based on a steering demand, according to a primary steering ratio $R_p$;

determining a compensated steering angle, wherein determining the compensated steering angle comprises combining the demanded rotation angle and the compensation angle; and adjusting the primary steering ratio $R_p$ to a compensated steering ratio $R_c$ to cause the steered wheel to rotate through the compensated rotation angle in response to the steering demand.

14. The computer-implemented method of claim 12, further comprising determining if the realignment procedure has cancelled the angular misalignment and, if it is determined that the realignment procedure has not cancelled the angular misalignment, determining an updated amount of angular misalignment and repeating the misalignment procedure.

15. The computer-implemented method of claim 12, wherein the control signal is configured to adjust the steering ratio of the hydraulic steering system by providing a control signal for controlling an electro-hydraulic valve.

16. A computer program product comprising instructions which, when the program is executed by a computer, cause the computer to carry out the method of claim 12.

17. A computer-readable medium having stored thereon the computer program product of claim 16.

* * * * *